(12) United States Patent
Xu (10) Patent No.: US 10,809,603 B1
(45) Date of Patent: Oct. 20, 2020

(54) LCD PROJECTOR

(71) Applicant: Yi Xu, Sichuan (CN)

(72) Inventor: Yi Xu, Sichuan (CN)

(73) Assignee: XINGGUANGPU TECHNOLOGY CHENGDU CO., LTD., Chengdu, Sichuan (CN)

( * ) Notice: Subject to any disclaimer, the term of this patent is extended or adjusted under 35 U.S.C. 154(b) by 0 days.

(21) Appl. No.: 16/563,827

(22) Filed: Sep. 7, 2019

(30) Foreign Application Priority Data

Jul. 20, 2019 (CN) .......................... 2019 1 0657919

(51) Int. Cl.
*G03B 21/00* (2006.01)
*G03B 21/16* (2006.01)
*G03B 21/20* (2006.01)
*G03B 21/14* (2006.01)
*G03B 33/08* (2006.01)
*H04N 9/31* (2006.01)

(52) U.S. Cl.
CPC ......... *G03B 21/006* (2013.01); *G03B 21/145* (2013.01); *G03B 21/16* (2013.01); *G03B 21/2013* (2013.01); *G03B 21/2033* (2013.01); *G03B 33/08* (2013.01); *H04N 9/3141* (2013.01)

(58) Field of Classification Search
CPC .................................................... G03B 21/26
See application file for complete search history.

(56) References Cited

U.S. PATENT DOCUMENTS

| 2006/0023172 | A1* | 2/2006 | Ikeda | G02B 27/0961 353/94 |
| 2019/0012555 | A1* | 1/2019 | Bae | G06K 9/0004 |
| 2020/0096848 | A1* | 3/2020 | Xu | G02B 27/286 |

\* cited by examiner

*Primary Examiner* — Paulos M Natnael (57) ABSTRACT

The invention discloses a novel LCD projector, comprising an imaging system with single-light path system for LCD projector time-division display, a lighting system with PCS (P light converted into S light) function, a three-primary-colors LED light source with microlenses, and a heat dissipation system with dust-proof and self-cleaning function; the monochrome LCD screen of the imaging system has a high light transmittance and resolution, achieving higher brightness and resolution; the lighting part has a polarized light conversion function, which converts the useless P light into useful S light, improving the light utilization and increasing the brightness; a transparent antifouling coating is applied on the optical components of the heat dissipation system to reduce dust adsorption; ultrasonic vibrators are mounted on the optical components to shake off the dust attached; the light source uses the microlens to converge the three-primary-color LED light source to improve light efficiency and uniformity.

9 Claims, 8 Drawing Sheets

LCD PROJECTOR

BACKGROUND OF THE INVENTION

1. Field of the Invention

The invention relates to the field of projectors, and in particular to a novel LCD projector.

2. Description of the Related Art

An LCD projector is an optical instrument that uses optical elements to magnify a display screen and project it onto a screen, and it is widely used in the field of large-sized display.

The conventional color LCD screen has a low light transmittance, and only one of the polarized lights can be used, and the light emitted by the LED light source contains both polarized lights: P light and S light, which results in extremely low light efficiency of the LCD projector, generally only 1-2%. Moreover, when the projector is in use, the optical device generates a large amount of heat, which seriously affects the life of the projector and the stationarity of use. Therefore, the LCD projector needs to be cooled down from the outside air with a fan when in use, which causes the problem of dirty and black spots inside the system after being used for a period of time and affects the display effect.

Therefore, the conventional LCD projector has the disadvantages of high power consumption, low brightness, and easy occurrence of dirty spots on the projection screen, which seriously affects the use value of the LCD projector.

SUMMARY OF THE INVENTION

The invention provides a novel LCD projector, comprising a heat dissipation system with dust-proof and self-cleaning function, a lighting system with PCS function, a three-primary-colors LED light source, and an imaging system with single-light path system for time-division display, which can effectively solve many shortcomings in the prior art. The full description of "PCS" is "polarization conversion system The invention is realized by the following technical solutions: a novel LCD projector, comprising a bottom shell, a first surface shell, and a second surface shell, wherein the first surface shell and the second surface shell are mounted on the upper end of the bottom shell and they form into a complete shell; the shell is equipped with an imaging system with single-light path system for time-division display, a lighting system with PCS function, a three-primary-colors LED light source, and a heat dissipation system with dust-proof and self-cleaning function; the imaging system with single-light path system for time-division display comprises a light source, a lighting system, a control circuitry, a monochrome LCD screen and a lens; the control circuitry processes the input color image signals and outputs three monochrome images of R, G, and B to the monochrome LCD screen in chronological order, and simultaneously lights the R, G, and B light sources in the three-primary-colors light source at corresponding times; when the emitted R light passes through the LCD screen, the R color portion of the image just appears on the LCD screen; when the emitted G light passes through the LCD screen, the G color portion of the image just appears on the LCD screen; when the emitted B light passes through the LCD screen, the B color portion of the image just appears on the LCD screen; the R, G, and B color portions of the image are time-divisionally projected onto the screen.

Preferably, the heat dissipation system is provided with a light source; one side of the heat dissipation system is provided with optical components, and the optical components are coated with a transparent antifouling coating to reduce the adsorption of dust; the heat dissipation comprises a dust filter and a fan that can be reversed, and the fan comprises a first fan and a second fan; the first fan is mounted on the outer side of the dust filter, which can be reversed to prevent the filter from being blocked, and the second fan is mounted on the output end of the optical components for discharging the internal hot air to the outside; the heat dissipation system and the light source are mounted on the top of the second fan.

Preferably, ultrasonic vibrators are mounted on the optical components for shaking off the dust attached thereto.

Preferably, the optical components comprise a first mirror, a second Fresnel lens, a reflective polarizing film, a monochrome LCD screen, a first Fresnel lens, a second mirror, and a lens; the monochrome LCD screen, the second Fresnel lens, the first mirror, and the lens are sequentially mounted on one side of the reflective polarizing film, and the first Fresnel lens, the light source, and the second mirror are sequentially mounted on the other side of the reflective polarizing film, and the light source and the second mirror are arranged side by side; the first mirror is obliquely disposed on one side of the reflective polarizing film, and the reflecting surface of the first mirror is directly disposed opposite to the lens.

Preferably, the lighting system with PCS function comprises a reflective polarizing film, a first Fresnel lens, and a second mirror.

Preferably, the light source comprises a three-primary-colors LED chip array with microlenses; the R, G, and B divergent rays emitted sequentially by the three-primary-colors are irradiated onto the first Fresnel lens after passing through the microlenses, and then irradiated onto the reflective polarizing film after being converted into parallel light via the first Fresnel lens; the S ray is transmitted, the P ray is reflected, and the reflected P ray is converged on the second mirror with ¼ wave piece after passing through the first Fresnel lens; the ¼ wave piece converts the P ray into the S ray, therefore, the rays reflected again on the reflective polarizing film are all S rays, and they are all irradiated onto the LCD screen via the reflective polarizing film.

Preferably, each LED chip in the LED array of the light source is formed by three RGB three-primary-colors LED chips, and each LED chip is provided with a microlens; the microlens is a freeform lens that converges the light emitted by the LED chip into a uniform spot of the shape and size of the LCD screen; each microlens accurately projects the chip emitted by the corresponding LED light onto the first Fresnel lens in accordance with the expected size, shape and uniformity.

Preferably, the reflective polarizing film is not parallel to the LCD screen but forms a small angle therewith.

Preferably, the second mirror is a plane mirror or a curved mirror.

The advantageous effects of the invention are: 1. For the imaging system with single-light path system for time-division display of the invention, since the monochrome LCD screen does not need to divide one pixel into three small sub-pixels of RGB, therefore, under the same technical conditions, the light transmittance can be increased by 3 times and the resolution can also be increased by 3 times, which makes it easier to achieve high brightness and high resolution for the projector.

2. The fan in the heat dissipation system of the invention has a reverse function and can be reversed for a period of time during shutdown, so that the dust filter can be cleaned by the reverse airflow to prevent the filter from being clogged; the optical components are coated with a transparent antifouling coating to reduce the adsorption of dust and other contaminants on the surface of the optical components; when the ultrasonic vibrator vibrates, the pollutants on the surface of the optical component can be detached and taken away by the cooling air, thus ensuring the cleanliness of the system, which solves the problem that the conventional LCD projector machine is prone to dirty and black spots after being used for a period of time.

3. The invention converts the useless P light in the conventional projector imagining into the useful S light, which improves the light utilization and greatly increases the brightness of the projection at the same power.

4. The microlenses and the three-primary-colors LED chips are in one-to-one correspondence; by adjusting the curvature and angle of the lens of each LED chip position, the shape of the spot of each LED chip on the LCD screen is similar to that of the LCD screen, and the size is slightly larger than the LCD display area. In this way, the uniformity of the light irradiated onto the LCD screen compared with the conventional reflector or the single beam expander is greatly improved, and the utilization efficiency of the LED light source and the uniformity of the illumination can be improved.

5. Each LED chipset consists of three RGB monochrome chips, enabling the RGB three primary colors to use the same lighting system, making the lighting system more compact.

In the figures, 1 refers to the bottom shell; 2 refers to the first mirror; 3 refers to the filter; 4 refers to the first fan; 5 refer to ultrasonic vibrators; 6 refers to the second mirror; 7 refers to the radiator; 8 refers to the light source; 9 refers to the second fan; 10 refers to the first Fresnel lens; 11 refers to the reflective polarizing film; 12 refers to the LCD screen; 13 refers to the second Fresnel lens; 14 refers to the lens; 15 refers to the first surface shell; 16 refers to the second surface shell; 17 refers to the screen; 18 refers to the base plate; 19 refers to the three-primary-colors LED chip; 20 refers to the microlens.

DETAILED DESCRIPTION OF THE PREFERRED EMBODIMENTS

As shown in FIG. 1-5, the novel LCD projector comprises a a bottom shell 1, a first surface shell 15, and a second surface shell 16, wherein the first surface shell 15 and the second surface shell 16 are mounted on the upper end of the bottom shell 1 and they form into a complete shell; the shell is equipped with an imaging system with single-light path system for time-division display, a lighting system with PCS function, a three-primary-colors LED light source, and a heat dissipation system with dust-proof and self-cleaning function; the imaging system with single-light path system for time-division display comprises a light source, a lighting system, a control circuitry, a monochrome LCD screen 12 and a lens; the control circuitry processes the input color image signals and outputs three monochrome images of R, G, and B to the monochrome LCD screen in chronological order, and simultaneously lights the R, G, and B light sources in the three-primary-colors light source at corresponding times; when the emitted R light passes through the LCD screen, the R color portion of the image just appears on the LCD screen; when the emitted G light passes through the LCD screen, the G color portion of the image just appears on the LCD screen; when the emitted B light passes through the LCD screen, the B color portion of the image just appears on the LCD screen; the R, G, and B color portions of the image are time-divisionally projected onto the screen.

Figure 1:
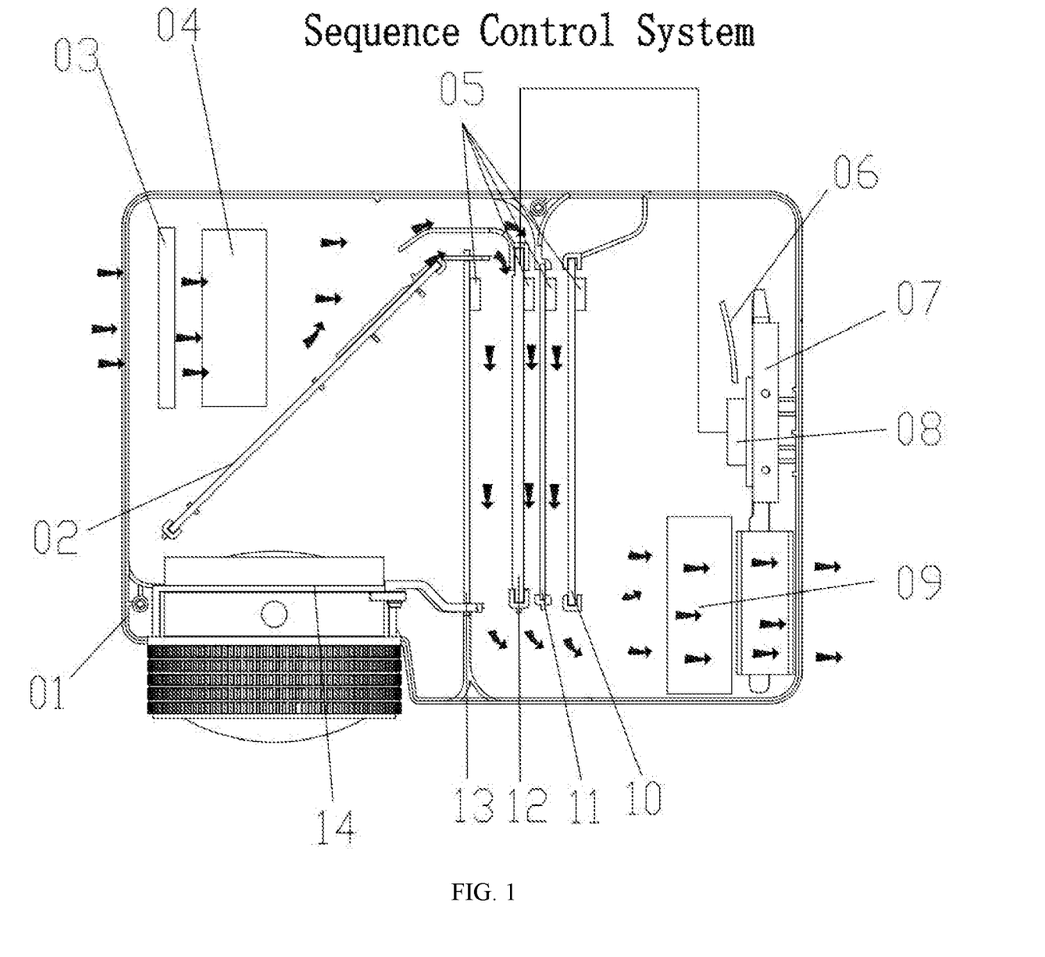
FIG. 1 is a schematic view illustrating the overall structure of the invention.
Figure 2:
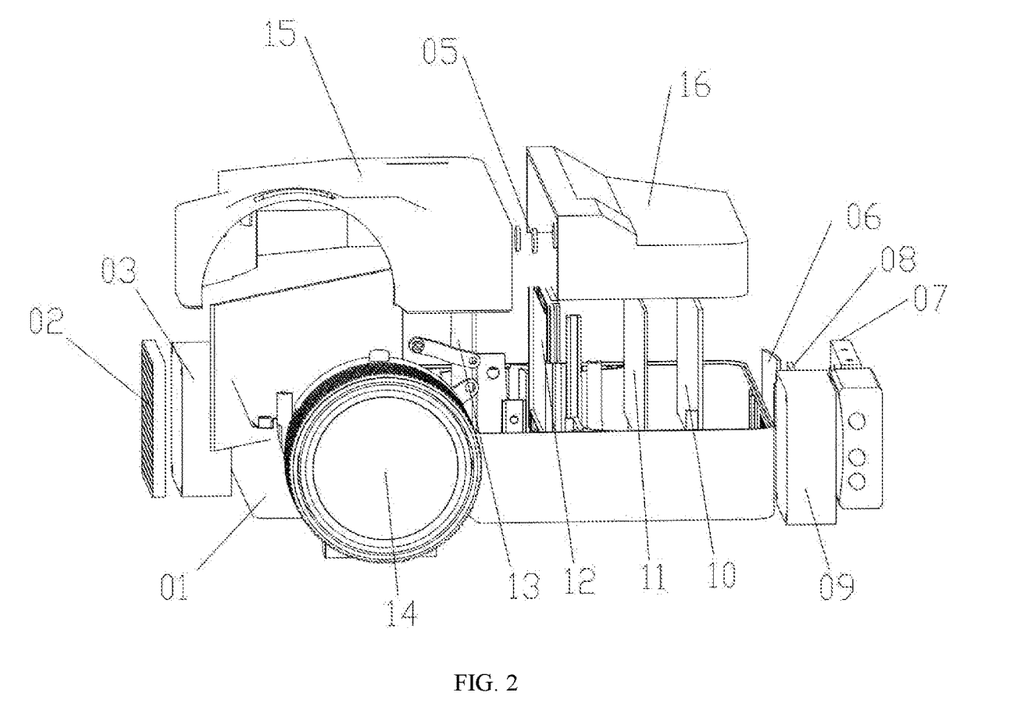
FIG. 2 is an overall exploded view illustrating the invention.
Figure 3:
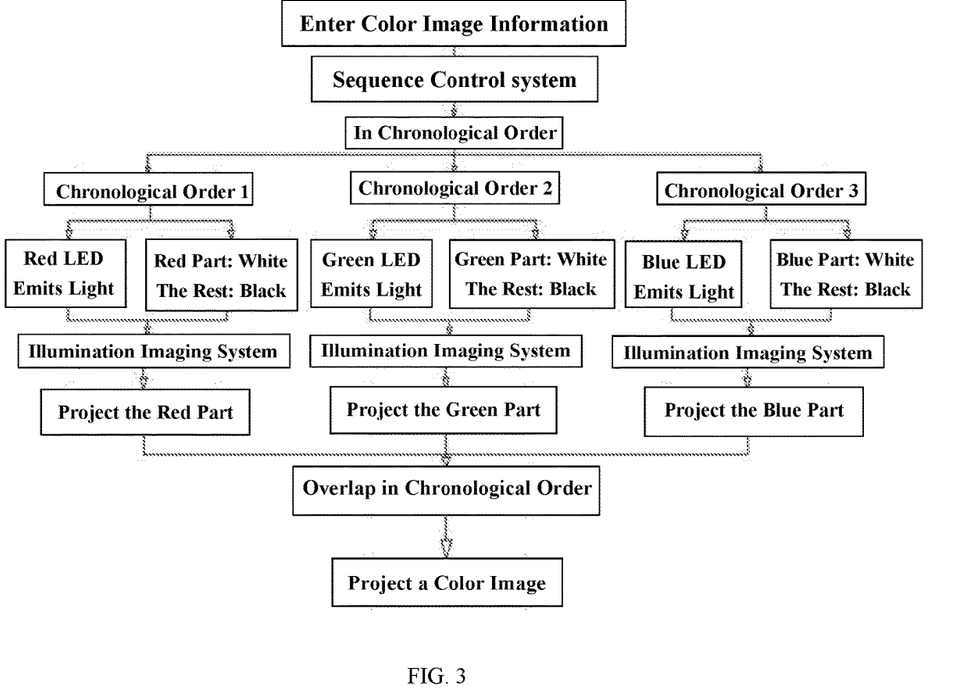
FIG. 3 is a schematic diagram illustrating the working principle of the imaging system with single-light path system for time-division display.

The heat dissipation system is provided with a light source 8; one side of the heat dissipation system is provided with optical components, and the optical components are coated with a transparent antifouling coating to reduce the adsorption of dust; the heat dissipation comprises a dust filter 3 and a fan that can be reversed, and the fan comprises a first fan 4 and a second fan 9; the first fan 4 is mounted on the outer side of the dust filter 3, and the second fan 9 is mounted on the output end of the optical components for discharging the internal hot air to the outside; the heat dissipation system and the light source 8 are mounted on the top of the second fan 9.

Ultrasonic vibrators 5 are mounted on the optical components for shaking off the dust attached thereto.

Figure 4:
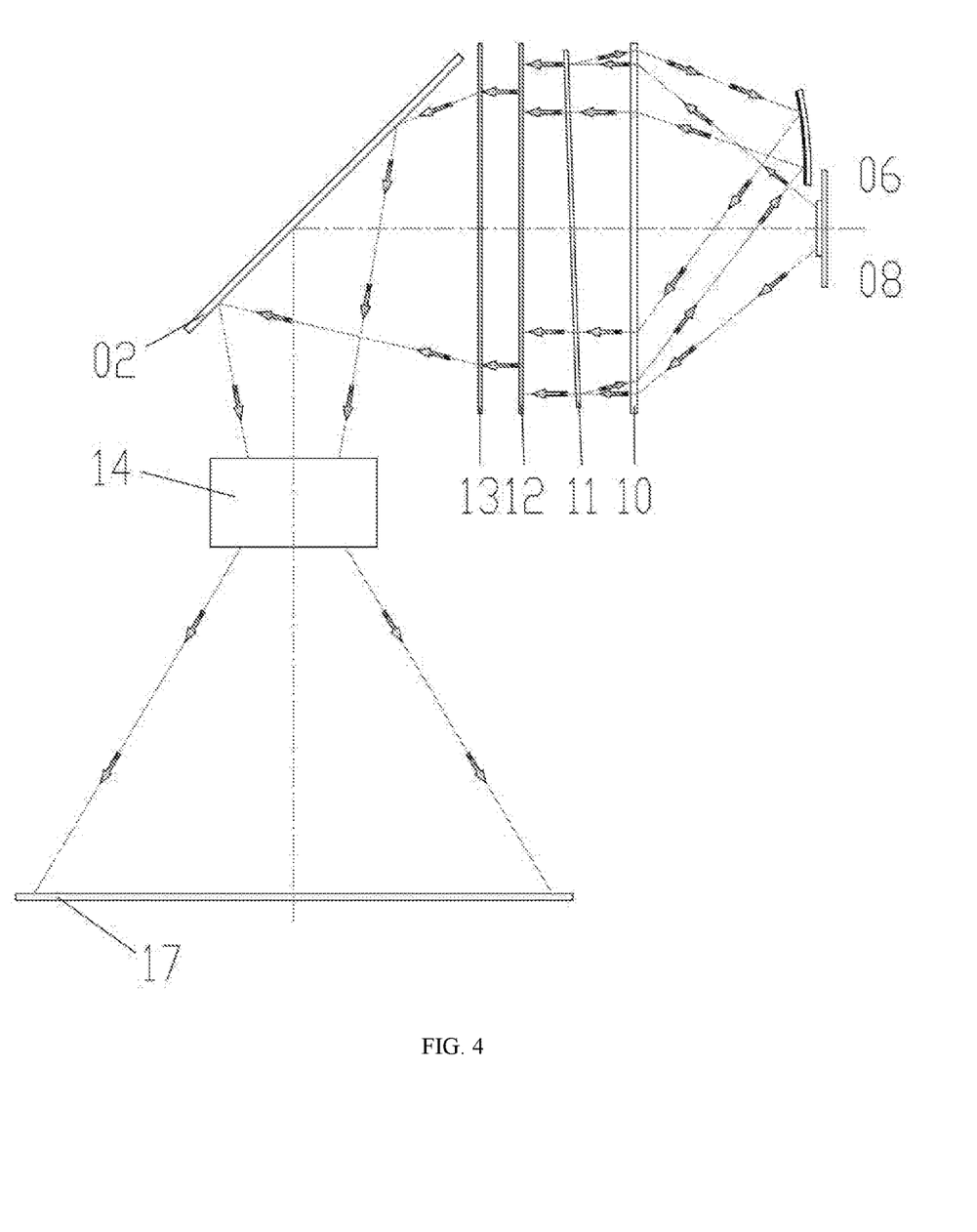
FIG. 4 is an overall optical schematic view illustrating the invention.

The optical components comprise a first mirror 2, a second Fresnel lens 13, a reflective polarizing film 11, a monochrome LCD screen 12, a first Fresnel lens 10, a second mirror 6, and a lens 14; the monochrome LCD screen 12, the second Fresnel lens 13, the first mirror 2, and the lens 14 are sequentially mounted on one side of the reflective polarizing film 11, and the first Fresnel lens 10, the light source 8, and the second mirror 6 are sequentially mounted on the other side of the reflective polarizing film 11, and the light source 8 and the second mirror 6 are arranged side by side; the first mirror 2 is obliquely disposed on one side of the reflective polarizing film 11, and the reflecting surface of the first mirror 2 is directly disposed opposite to the lens 14.

Figure 5:
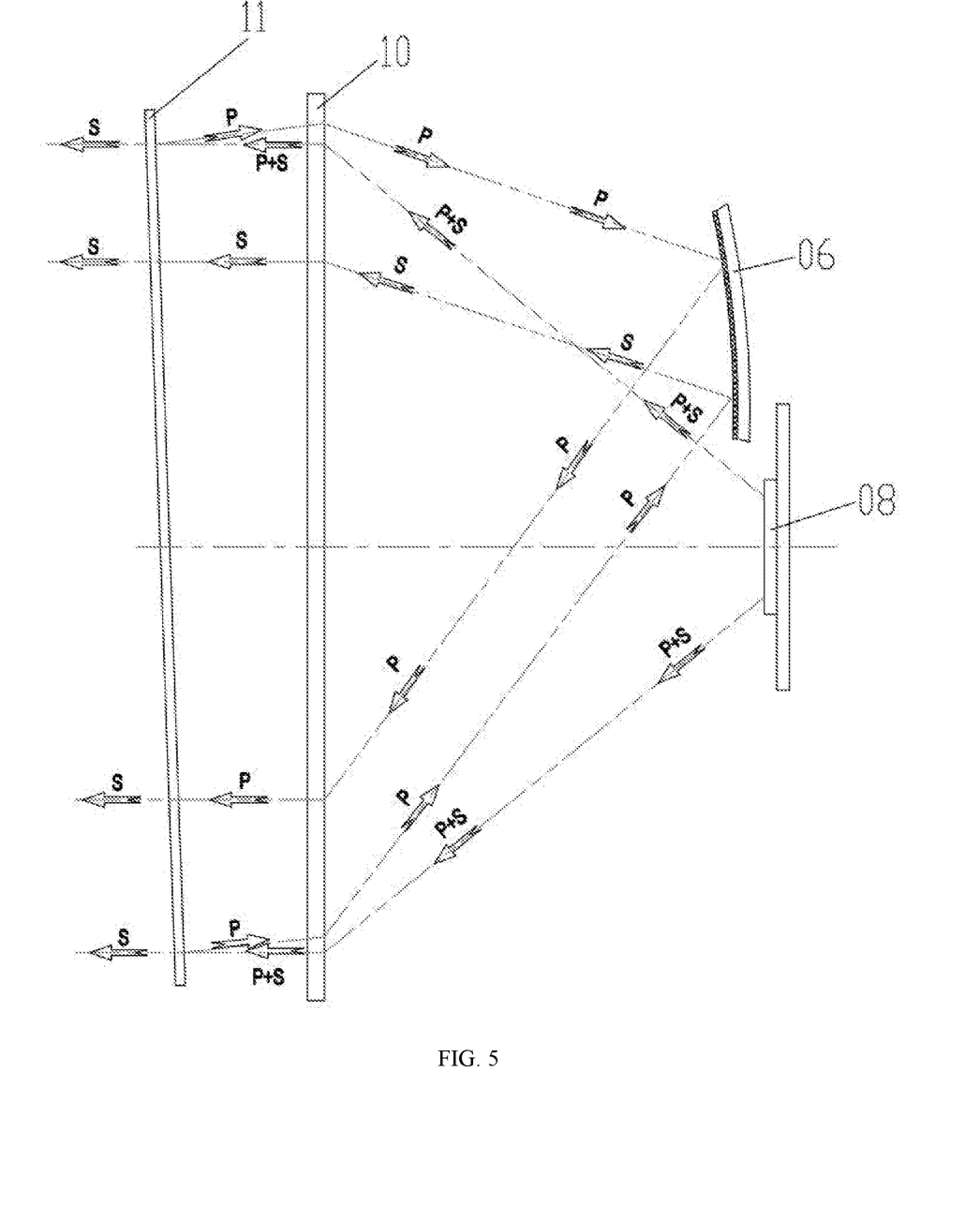
FIG. 5 is a schematic view illustrating the structure of the polarization conversion structure in the lighting assembly of the invention.

The lighting system with PCS function comprises a reflective polarizing film 11, a first Fresnel lens 10, and a second mirror 6.

Figure 6:
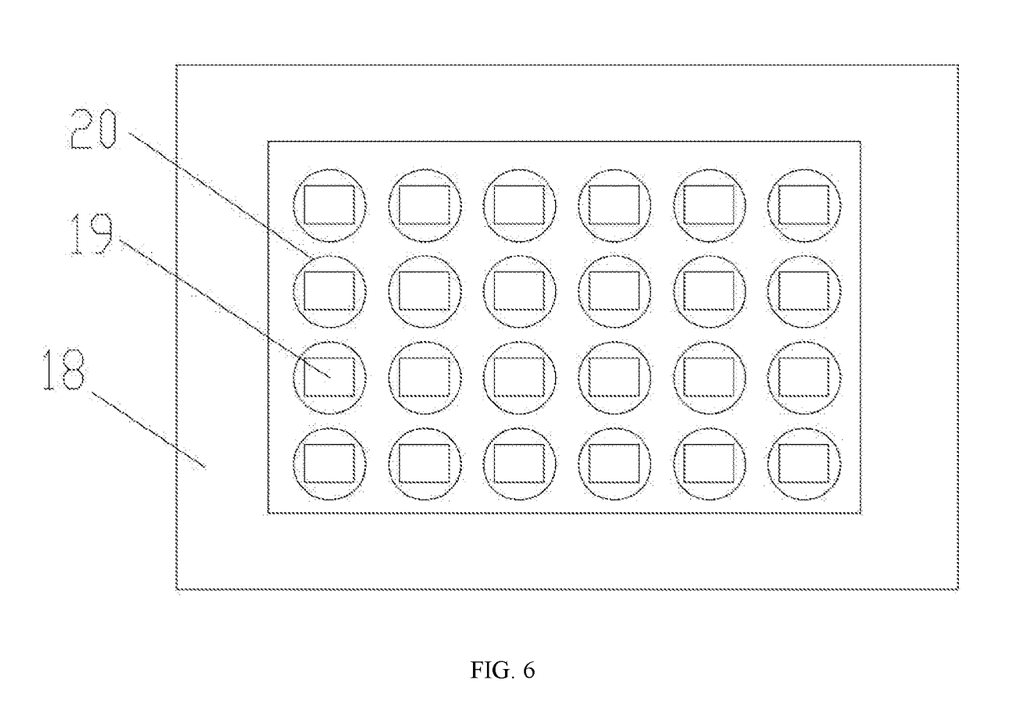
FIG. 6 is a structural view illustrating the three-primary-colors light source.
Figure 7:
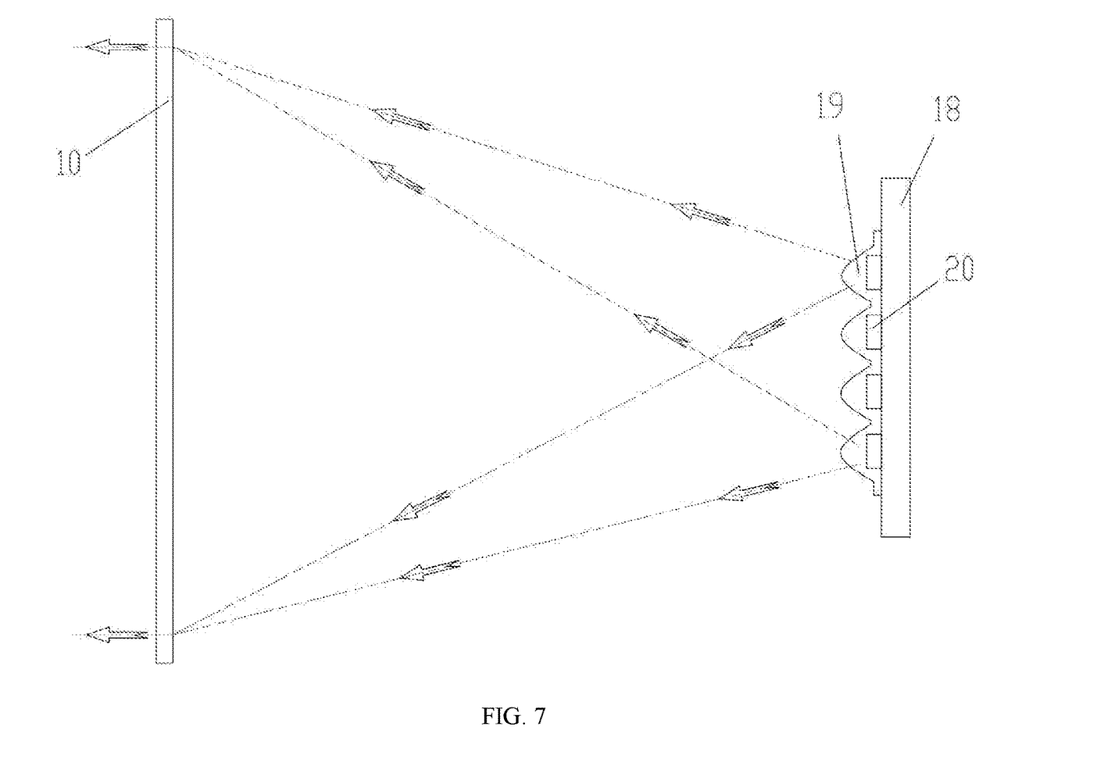
FIG. 7 is an optical schematic illustrating the three-primary-colors light source.
Figure 8:
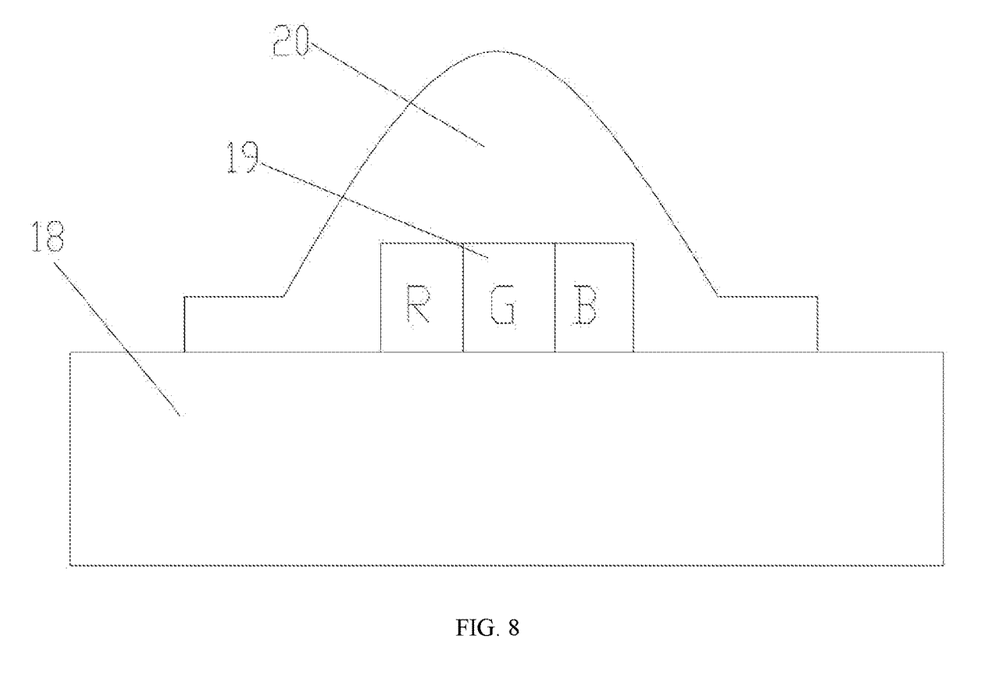
FIG. 8 is a structural view illustrating the monochrome three-primary-colors LED light source.

As shown in FIG. 6-8, the light source 8 comprise a three-primary-colors LED chip array with microlenses; the R, G, and B divergent rays emitted sequentially by the three-primary-colors are irradiated onto the first Fresnel lens 10 after passing through the microlenses, and then irradiated onto the reflective polarizing film 11 after being converted into parallel light via the first Fresnel lens 10; the S ray is transmitted, the P ray is reflected, and the reflected P ray is converged on the second mirror with ¼ wave piece after passing through the first Fresnel lens; the ¼ wave piece converts the P ray into the S ray, therefore, the rays reflected again on the reflective polarizing film are all S rays, and they are all irradiated onto the LCD screen via the reflective polarizing film.

Each LED chip in the LED array of the light source 8 is formed by three RGB three-primary-colors LED chips, and each LED chip is provided with a microlens; the microlens is a freeform lens that converges the light emitted by the LED chip into a uniform spot of the shape and size of the LCD screen; each microlens accurately projects the chip emitted by the corresponding LED light onto the first Fresnel lens in accordance with the expected size, shape and uniformity.

The reflective polarizing film 11 is not parallel to the LCD screen 12 but forms a small angle therewith.

In the embodiment, the imaging system for time-division display is a monochrome LCD screen with high light transmittance and resolution, which enables the projector to achieve higher brightness and resolution; the lighting part has a polarized light conversion function, and the invention converts the useless P light in the conventional projector imagining into the useful S light, which improves the light utilization and greatly increases the brightness of the projection at the same power, and a transparent antifouling coating is applied on the optical components of the heat dissipation system to reduce dust adsorption; In order to further improve the cleanliness of the system, ultrasonic vibrators are mounted on the optical components to shake off the dust attached thereto; the radiator fan can be reversed to clean the dust filter; the light source of the LED lighting portion consists of arrays of LED chipset, each LED chipset in the LED array is formed by three separate RGB three-primary-colors LED, and a microlens is mounted on each LED chipset to concentrate the light emitted by the LED, which improves the efficiency and uniformity of light.

The above is only the specific embodiment of the present invention, but the scope of the present invention is not limited thereto, and any changes or substitutions that are not thought of by the creative work are included in the scope of the present invention. Therefore, the scope of the invention should be determined by the scope of the invention as defined by the appended claims.

The invention claimed is:

1. A novel LCD projector, comprising a bottom shell, a first surface shell, and a second surface shell, wherein the first surface shell and the second surface shell are mounted on the upper end of the bottom shell and they form into a complete shell; the shell is equipped with an imaging system with single-light path system for time-division display, a lighting system with polarization conversion system (PCS) function, a three-primary-colors LED light source, and a heat dissipation system with dust-proof and self-cleaning function; the imaging system with single-light path system for time-division display comprises a light source, a lighting system, a control circuitry, a monochrome LCD screen and a lens; the control circuitry processes the input color image signals and outputs three monochrome images of R, G, and B to the monochrome LCD screen in chronological order, and simultaneously lights the R, G, and B light sources in the three-primary-colors light source at corresponding times; when the emitted R light passes through the LCD screen, the R color portion of the image just appears on the LCD screen; when the emitted G light passes through the LCD screen, the G color portion of the image just appears on the LCD screen; when the emitted B light passes through the LCD screen, the B color portion of the image just appears on the LCD screen; the R, G, and B color portions of the image are time-divisionally projected onto the screen.

2. The novel LCD projector according to claim 1, wherein the heat dissipation system is provided with a light source; one side of the heat dissipation system is provided with optical components, and the optical components are coated with a transparent antifouling coating to reduce the adsorption of dust; the heat dissipation comprises a dust filter and a fan that can be reversed, and the fan comprises a first fan and a second fan; the first fan is mounted on the outer side of the dust filter, and the second fan is mounted on the output end of the optical components for discharging the internal hot air to the outside; the heat dissipation system and the light source are mounted on the top of the second fan.

3. The novel LCD projector according to claim 2, wherein ultrasonic vibrators are mounted on the optical components for shaking off the dust attached thereto.

4. The novel LCD projector according to claim 2, wherein the optical components comprise a first mirror, a second Fresnel lens, a reflective polarizing film, a monochrome LCD screen, a first Fresnel lens, a second mirror, and a lens; the monochrome LCD screen, the second Fresnel lens, the first mirror, and the lens are sequentially mounted on one side of the reflective polarizing film, and the first Fresnel lens, the light source, and the second mirror are sequentially mounted on the other side of the reflective polarizing film, and the light source and the second mirror are arranged side by side; the first mirror is obliquely disposed on one side of the reflective polarizing film, and the reflecting surface of the first mirror is directly disposed opposite to the lens.

5. The novel LCD projector according to claim 1, wherein the lighting system with PCS function comprises a reflective polarizing film, a first Fresnel lens, and a second mirror.

6. The novel LCD projector according to claim 1, wherein the light source comprises a three-primary-colors LED chip array with microlenses; the R, G, and B divergent rays emitted sequentially by the three-primary-colors are irradiated onto the first Fresnel lens after passing through the microlenses, and then irradiated onto the reflective polarizing film after being converted into parallel light via the first Fresnel lens; the S ray is transmitted, the P ray is reflected, and the reflected P ray is converged on the second mirror with ¼ wave piece after passing through the first Fresnel lens; the ¼ wave piece converts the P ray into the S ray, therefore, the rays reflected again on the reflective polarizing film are all S rays, and they are all irradiated onto the LCD screen via the reflective polarizing film.

7. The novel LCD projector according to claim 1, wherein each LED chip in the LED array of the light source is formed by three RGB three-primary-colors LED chips, and each LED chip is provided with a microlens; the microlens is a freeform lens that converges the light emitted by the LED chip into a uniform spot of the shape and size of the LCD screen; each microlens accurately projects the chip emitted by the corresponding LED light onto the first Fresnel lens in accordance with the expected size, shape and uniformity.

8. The novel LCD projector according to claim 4, wherein the reflective polarizing film is not parallel to the LCD screen but forms a small angle therewith.

9. The novel LCD projector according to claim 4, wherein the second mirror is a plane mirror or a curved mirror.

* * * * *